(12) United States Patent
Beever

(10) Patent No.: US 6,283,240 B1
(45) Date of Patent: Sep. 4, 2001

(54) VEHICLE

(75) Inventor: Paul Adrian Beever, Solihull (GB)

(73) Assignee: Rover Group Limited, Warwick (GB)

(*) Notice: Subject to any disclaimer, the term of this patent is extended or adjusted under 35 U.S.C. 154(b) by 0 days.

(21) Appl. No.: 09/387,152

(22) Filed: Aug. 31, 1999

(30) Foreign Application Priority Data

Sep. 2, 1998 (GB) .................................................. 9818960

(51) Int. Cl.$^7$ ................................................ B60K 31/02
(52) U.S. Cl. ............................ 180/178; 180/179; 701/93; 701/94
(58) Field of Search .................................. 180/178, 179, 180/65.2, 65.8; 701/93, 94

(56) References Cited

U.S. PATENT DOCUMENTS

| | | |
|---|---|---|
| 4,263,997 | 4/1981 | Poore . |
| 4,671,235 * | 6/1987 | Hosaka ................................. 123/352 |
| 4,884,203 * | 11/1989 | Preis et al. ........................ 364/426.04 |
| 5,125,485 | 6/1992 | Lang ..................................... 192/1.24 |
| 5,234,071 * | 8/1993 | Kajiwara ............................... 180/169 |
| 5,646,850 | 7/1997 | Ishida et al. . |
| 5,700,227 | 12/1997 | Kosik et al. . |
| 5,731,977 | 3/1998 | Taniguchi et al. ............ 364/426.011 |
| 5,785,138 | 7/1998 | Yoshida ............................... 180/65.2 |
| 5,794,735 * | 8/1998 | Sigl ...................................... 180/170 |
| 5,835,878 * | 11/1998 | Saito et al. ............................. 701/94 |

FOREIGN PATENT DOCUMENTS

| | | |
|---|---|---|
| 28 29 894 | 1/1980 | (DE) . |
| 196 54 769 A1 | 7/1998 | (DE) . |
| 0612641 | 2/1994 | (EP) . |
| 0 874 149 A2 | 4/1998 | (EP) . |
| 0 992 412 A1 | 4/2000 | (EP) . |
| 2308415 | 5/1979 | (GB) . |
| 2 152 710 A | 8/1985 | (GB) . |
| 2283338 | 10/1993 | (GB) . |
| 2308415 | 9/1995 | (GB) . |
| 94/10002 | 5/1994 | (WO) . |
| 95/13203 | 5/1995 | (WO) . |
| 96/11826 | 4/1996 | (WO) . |
| 96/40534 | 12/1996 | (WO) . |
| 98/34809 | 8/1998 | (WO) . |

* cited by examiner

Primary Examiner—Michael Mar
Assistant Examiner—Christopher Buchanan
(74) Attorney, Agent, or Firm—Davis & Bujold, P.L.L.C.

(57) ABSTRACT

A vehicle speed control system can be activated so as to control the vehicle speed in a modified way in response to the driver's inputs. When activated, the accelerator 30 position defines a target speed and the speed controller 22 controls both the engine 34, via and engine control unit 36 and the brakes 14, 16, via a hydraulic brake control unit 20 so as to control the vehicle speed to the target speed. The acceleration of the vehicle is also controlled according to the difference between the present vehicle speed and the present target speed.

15 Claims, 4 Drawing Sheets

VEHICLE

FIELD OF THE INVENTION

The invention relates to the control of vehicle speed and in particular to improvements in the integration of the control of vehicle speed using various components of the vehicle.

BACKGROUND TO THE INVENTION

Conventionally vehicles have an engine management system for controlling the torque output from the engine. This may form part of an integral power train controller, for example in hybrid vehicles where an engine and an electric motor need to be co-ordinated to provide driving torque for the vehicle. It is also well known to control electronically the level of braking in a vehicle using hydraulic brake modulators or control of electric brakes.

The present invention aims to improve integration of the control of the various parts of the power train and braking systems of a vehicle.

SUMMARY OF THE INVENTION

According to the present invention there is provided a vehicle speed control system comprising, at least one driving device arranged to produce drive for the vehicle, at least one braking device arranged to produce braking of the vehicles a vehicle speed sensor for determining a measured speed of the vehicles a speed controller, a driver operated acceleration demand indicator for producing a signal indicative of a demanded acceleration and driver operated deceleration demand indicator for producing a signal indicative of a demanded deceleration, wherein the speed controller is arranged to receive the signals from the two demand indicators and to control the at least one driving device and the at least one braking device so as to produce the demanded level of acceleration or deceleration.

The use of a single speed control unit to receive signals from the driver demanding acceleration and deceleration and control both acceleration and deceleration of the vehicle allows a large degree of flexibility in the control and management of the various sources of driving and braking torque in the vehicle.

The speed control unit may be integrated into a conventional type of brake control unit, engine management system, or power train controller, or it may be provided as a separate control unit which provides inputs to them.

The present invention further provides a vehicle speed control system comprising an acceleration demand member movable through a range of positions, at least one drive device, and a speed controller arranged to control the at least one drive device to control the speed of the vehicle in response to operation of the acceleration demand member, wherein the speed controller is operable in a first mode in which each of said positions has a target speed associated with it, such that when the acceleration demand member is in that position the speed controller is arranged to bring the vehicle speed towards the target speed, and a second mode in which each of said positions has a target drive torque associated with it and the speed controller is arranged to control the at least one drive device to produce the target torque substantially independently of the vehicle speed.

Preferred embodiments of the invention will now be described by way of example and with reference to the accompanying drawings.

DESCRIPTION OF THE PREFERRED EMBODIMENTS

Figure 1:
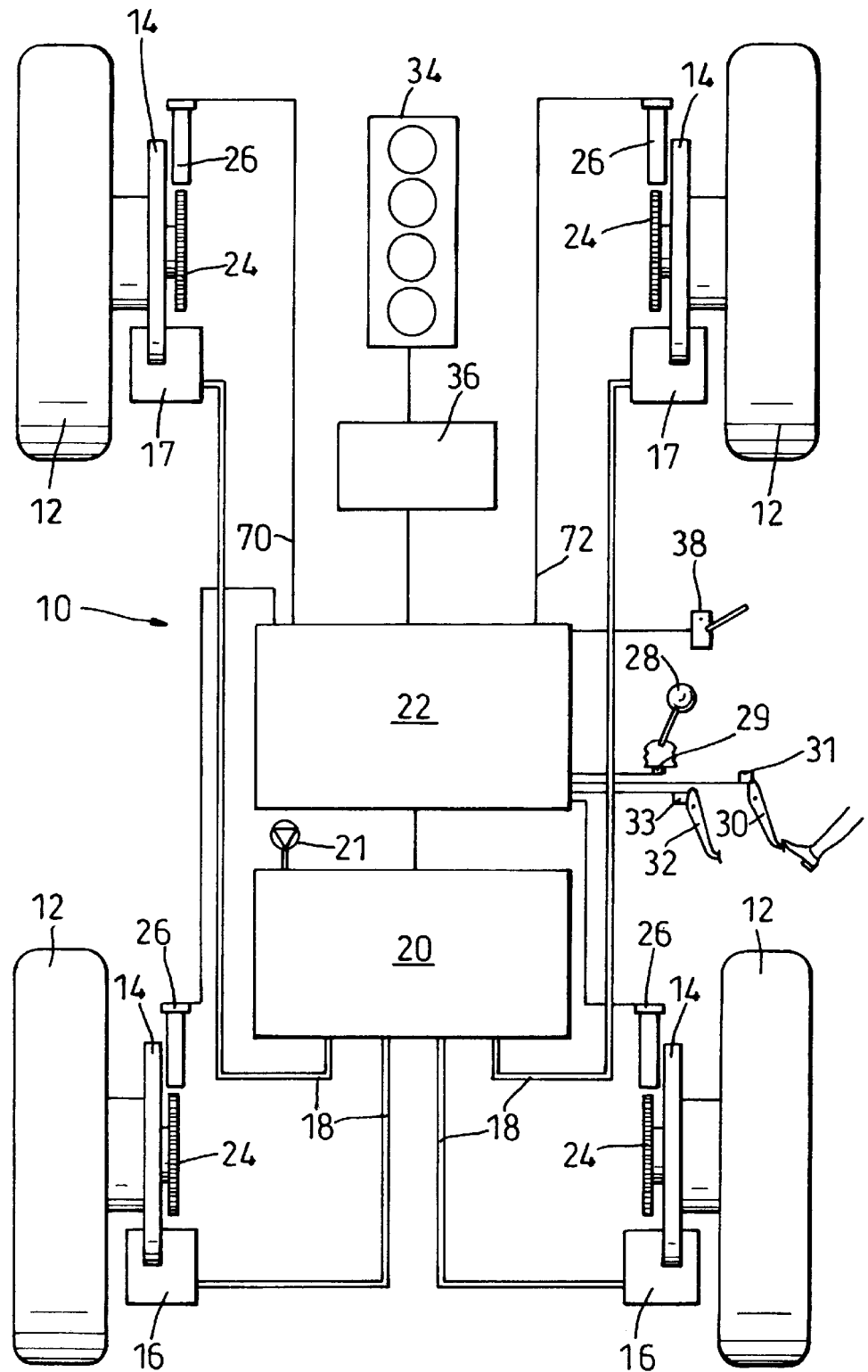
FIG. 1 is a schematic diagram of a vehicle including a system according to a first embodiment of the invention.

Referring to FIG. 1, in the first embodiment the vehicle 10 includes four wheels 12. Each wheel 12 is provided with a co-rotating brake disc 14 which is acted upon by a brake calliper 16. The brake callipers 16 are hydraulically operated and a hydraulic line 18 leads from each brake calliper to a hydraulic brake control system 20. The hydraulic brake control system 20 essentially comprises a valve block, the valves of which control the pressure of brake fluid supplied from a pump 21 to the brakes 16, 17, under the control of the speed control unit 22. This enables the braking to be controlled directly by the driver using the hydraulic actuation, or to be increased above the level directly demanded by the driver using the pump as a source of braking pressure, or reduced below that level.

Each wheel 12 also carries a co-rotating toothed wheel 24. An inductive sensor 26 is provided adjacent each toothed wheel 24 and provides a signal to the speed control unit 22 in the form of a regular waveform voltage, the frequency of which is indicative of the wheel speed.

A gear lever 28 is also provided for selecting a gear ratio in a transmission of the vehicle and a sensor 29 is associated with the gear lever 28 and connected to the speed control unit 22 to send a signal to the speed control unit 22 indicative of which of the available range of forwards and reverse gears has been selected.

An accelerator pedal 30 has a continuously variable sensor in the form of a potentiometer 31 associated with it which provides an analogue signal to the electronic control unit 22 which is dependent upon the position, or angle, of the accelerator pedal. Similarly a brake pedal 32 has a potentiometer 33 associated with it which provides a signal to the speed control unit 22 which is indicative of the position of the brake pedal 32.

The vehicle 10 is powered by means of an engine 34 the fuelling and air supply to which is controlled by an engine control unit 36.

A manually operable switch 38 is also connected to the electronic control unit 22.

In use, the vehicle is driven normally when the switch 38 is switched off and the speed control system is in 'normal mode'. Under these conditions the signal from the accelerator pedal potentiometer 31 is transmitted directly by the speed control unit 22 to the engine control unit 36 and interpreted as a torque demand signal. The engine control unit 36 then controls the fuelling and air supply to the engine so that the required torque is produced by the engine. This torque is then transmitted to the wheels 12 through the transmission at whatever ratio has been selected by the driver using the gear lever 28. The braking is also controlled in the conventional manner with the braking pressure being controlled directly by the driver using the brake pedal 32 subject to the anti-lock and traction control functions which are always provided by the speed control unit 22. Both of these functions are carried out in known manner by monitoring the speed and acceleration of each wheel 12 and a detected vehicle speed calculated from the speeds of all the wheels. The detected vehicle speed is calculated by using an average of all the wheel speeds, but ignoring the speeds of any wheels which are detected as locked or spinning. Locked wheels will be released by releasing braking pressure supplied to them, and spinning wheels will be slowed by applying a braking pressure from the pump 21.

When the activation switch 38 is switched on by the driver to select hill descent mode, the hill descent control will become active. In hill descent mode the speed control unit 22 determines from the position of the accelerator pedal 30 and the brake pedal 32 a target speed and a target acceleration or deceleration for the vehicle. It then determines the most appropriate manner in which to produce these targets and outputs a torque demand signal, either for a driving torque or a braking torque, to the engine control unit, and/or a braking torque demand signal to the braking control unit to control the driving torque and the braking torque accordingly.

Figure 2:
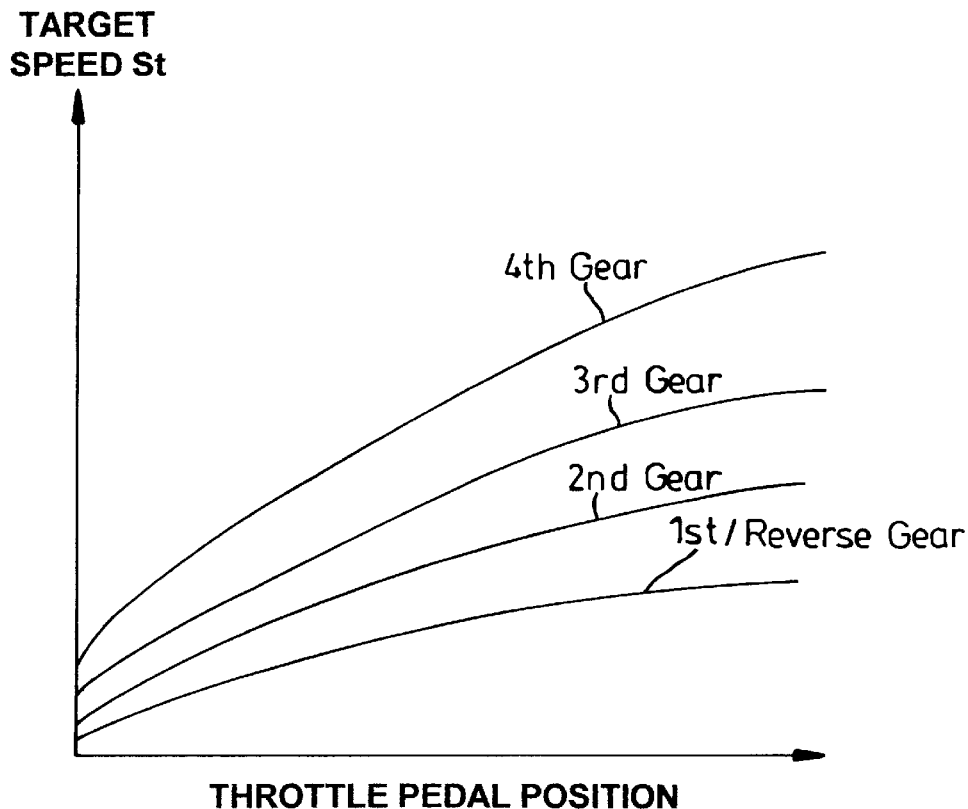
FIGS. 2 and 3 are diagrams showing operating characteristics of the system of FIG. 1.

Referring to FIG. 2, the target speed for each position of the accelerator pedal 30 is equal to the speed that the vehicle will travel at on a smooth level road if the accelerator pedal in that position and the speed control unit 22 operating in the normal mode. The target speed therefore increases steadily with depression of the accelerator pedal. Also, there is a separate target speed characteristic for each gear ratio of the transmission, as detected from the gear lever position sensor 29, since the road speed in normal mode is dependent on the gear ratio selected.

Figure 3:
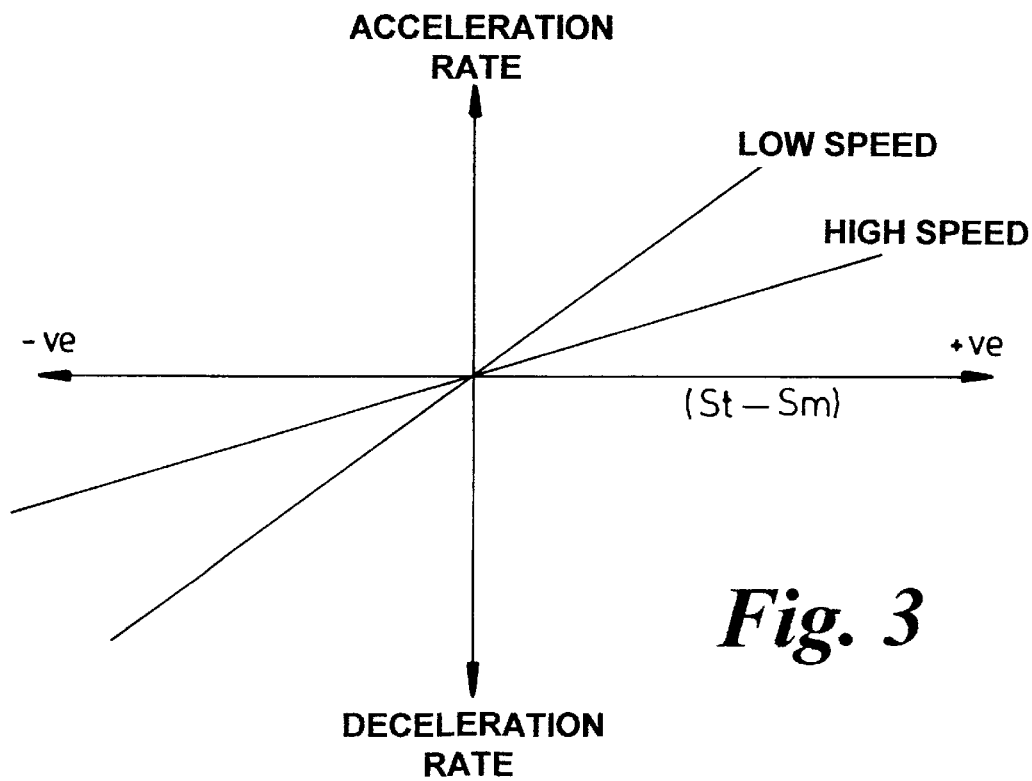

Referring to FIG. 3, the target acceleration rate at (which is positive for acceleration and negative for deceleration) is set by the speed control unit 22 and is controlled so as to vary in a predetermined manner with the difference between the target speed $S_t$ and the measured road speed $S_m$. The characterised which determines the acceleration rate or deceleration rate is shown in FIG. 3 and generally increases the target acceleration as the difference between the target speed $S_t$ and the measured road speed $S_m$ increases. The characteristic is shaped so as to correspond approximately to the behaviour of the vehicle in a smooth flat surface. The target acceleration rate is given by the formula:

$$a_t = a_{max}(s_t - s_m)/(s_{max} - s_m)$$

where $a_{max}$ is the maximum acceleration possible, and $s_{max}$ is the maximum speed possible on flat ground. For any combination of vehicle speed and gear ratio, arax and smax are fixed, so at varies linearly with $(s_t-s_m)$. In any gear ratio, as the instantaneous speed $s_m$ increases towards $s_{max}$ the target acceleration rate at will decrease for any given value of $(s_t-s_m)$. The characteristics of target acceleration rate as a function of $(s_t-s_m)$ are therefore a series of straight lines, the gradient of which increases with vehicle speed as shown in FIG. 3.

As shown in FIG. 2 there is for each gear a minimum target speed which is set at such a level that the engine will be running at idle speed, or slightly faster, when the vehicle is travelling at the minimum target speed. However this has the disadvantage that the speed control system cannot control the vehicle speed down to very low speeds or to a standstill. In order to overcome this problem, use can be made of known technology which provides automatic control of a vehicle clutch to provide controlled gear changes in a manual-type transmission. Basically this technology controls the engagement of the clutch automatically in response to movement of the manual gear select lever by the driver so as to provide a smooth gear change without the need for clutch control by the driver. The control system for this type of system could be modified so as to co-operate with the speed control system of the present invention by disengaging the clutch if the vehicle speed falls below that corresponding to engine idle speed. This would enable the vehicle speed to be controlled down to zero on a hill descent. For speed control on flat ground or on ascent of a hill, the system could also be modified so as to control the engagement of the clutch so as to maintain the target vehicle speed, whilst keeping the engine speed constant. This again would allow control for speeds down to zero.

Figure 4:
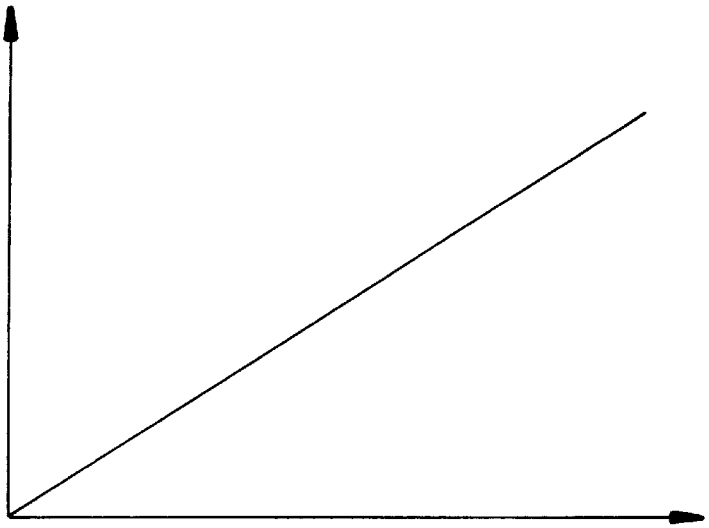
FIG. 4 is a diagram showing a target deceleration as a function of brake pedal depression.

Referring to FIG. 4 in the hill descent mode the speed control unit 22 interprets the position of the brake pedal 32 as a demand for deceleration, A target deceleration is defined for each position of the brake pedal, and the rate of deceleration increases with increasing depression of the brake pedal 32. It then determines the best manner in which to provide the demanded level of deceleration. Generally engine braking will be used in preference to use of the disc brakes if it can produce the required level of braking. However the proportion of braking produced by the power train and the disc brakes may depend on the speed at which braking is required. In the event of a demand for sudden braking the disc brakes produce substantially all of the braking initially because they can respond much faster than the braking from the power train, but then as the engine braking available increases the braking torque from the disc brakes is reduced so as to keep the total deceleration at the required level.

Clearly if only one of the brake and accelerator pedals is depressed by the driver, the speed control unit 22 can control the speed of the vehicle simply as described above. However, if both of the pedals are depressed the speed control unit 22 needs to resolve the conflicting demands of the driver. This can be done in various ways.

The simplest is to use any demand for deceleration from the brake pedal to over-ride a demand for acceleration or speed from the accelerator pedal. Then if ever both pedals are depressed the signal from the accelerator pedal is ignored and the vehicle decelerated as requested by the position of the brake pedal.

Another way of resolving the conflicting demands is to 'add together' the two demands to reach a net demand for acceleration or deceleration, and control the power train and brakes accordingly, as if the net demand were being given by the driver using only one of the pedals. This has the advantage that it is closer to what the driver would expect from a conventional vehicle but avoids the waste of energy caused when the brakes and power train are operated in conflict with each other.

Figure 5:
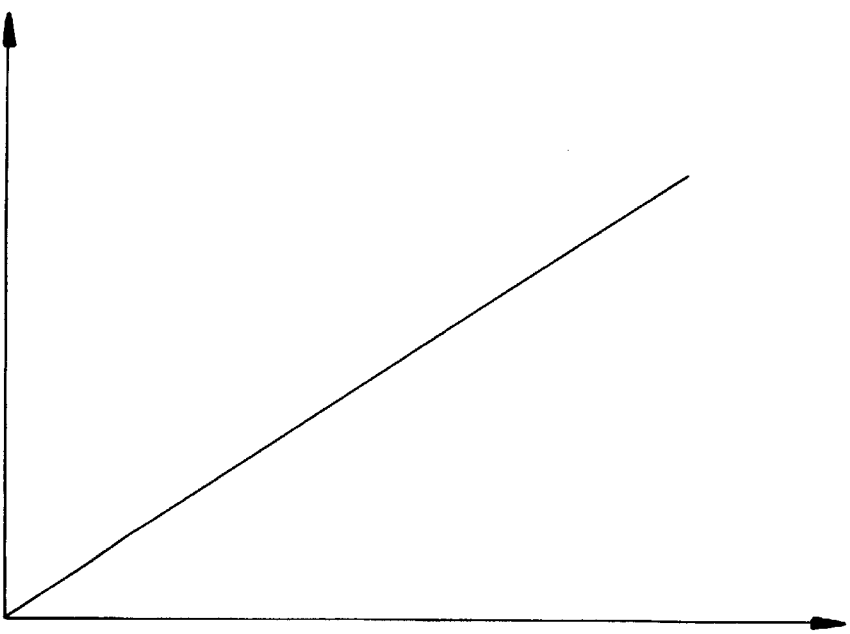
FIG. 5 is a diagram showing target braking torque deceleration as a function of brake pedal position.

Referring to FIG. 5 in a variant of the first embodiment, in the hill descent mode, the speed control unit 22 interprets the brake pedal position as a demand for a specific braking torque. Therefore for each position of the brake pedal a target braking torque is defined. The speed control unit then controls the engine 34 and brakes 16 so as to produce the required braking torque.

Figure 6:
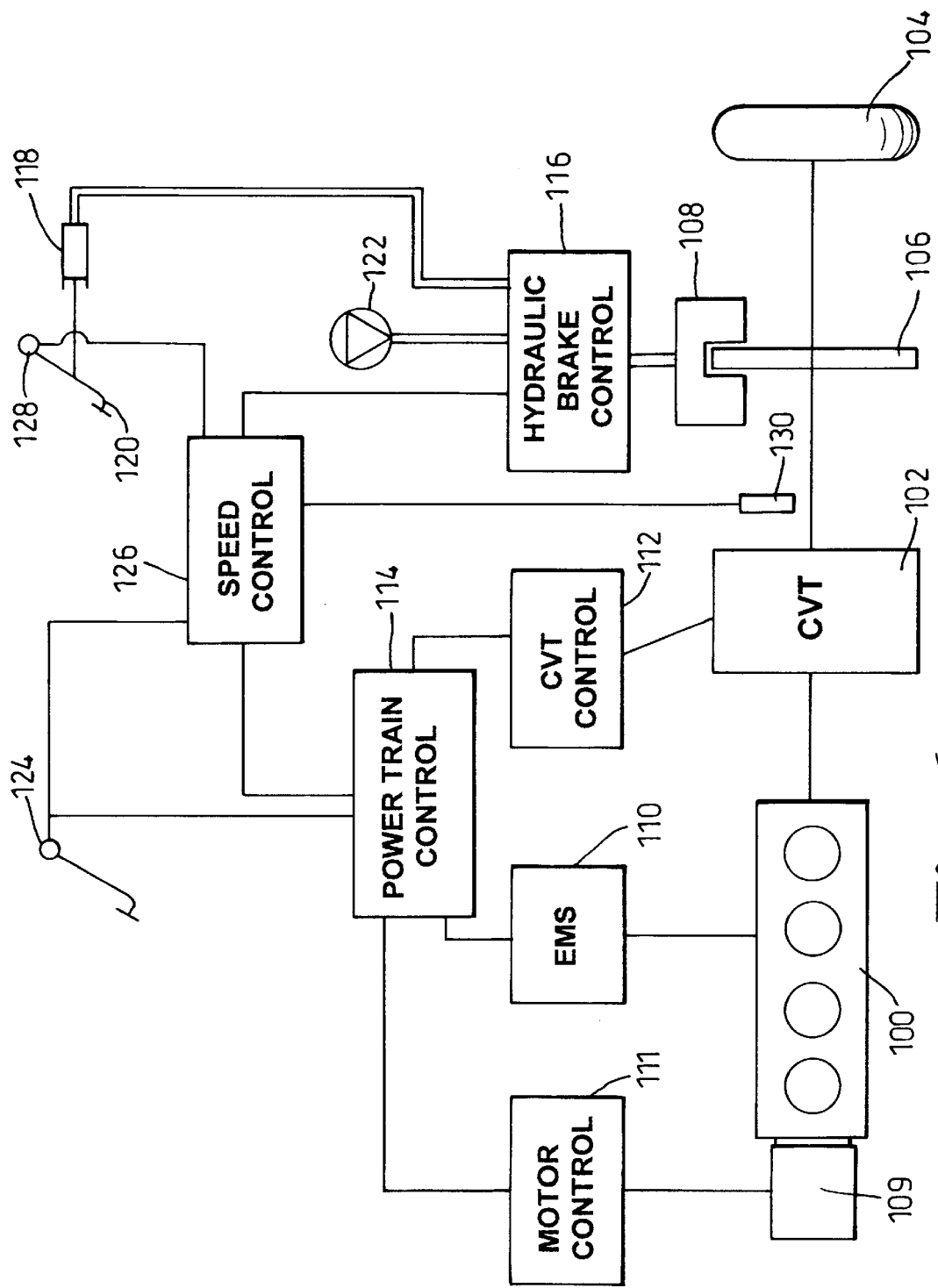
FIG. 6 is a schematic diagram of a vehicle including a system according to a second embodiment of the invention.

Referring to FIG. 6, in a second embodiment of the invention a vehicle includes an engine 100 for producing drive which is input to a continuously variable transmission (CVT) 102 from which it is transmitted to the vehicle wheels 104, which have brake discs 106 connected to them arranged to be acted on by hydraulically operated brake callipers 108. An electric motor/generator 109 which is operable as a starter motor for the engine, as a source of tractive drive torque, and as a generator to provide regenerative braking, is also included in the power train. The fuelling, air supply and spark timing of the engine are controlled by an engine management system (EMS) 110, the motor/generator 109 is controlled by a motor controller 111, and the ratio of the CVT is controlled by a CVT controller 112. The EMS 110, motor controller 111, and the CVT controller 112 are all controlled by a power train controller 114. The brake fluid pressure to the callipers 108 is controlled by a hydraulic brake control unit 116 which comprises a valve block controlling the fluid pressure received from a brake master cylinder 118, operated by a brake pedal 120, and from a pump 122. The power train controller 114 receives an input from an accelerator pedal potentiometer 124. A speed controller 126 also receives inputs from the accelerator pedal potentiometer 124, a brake pedal accelerometer 126 and a set of wheel speed sensors 130 which enable it to determine the ground speed of the vehicle.

Under normal operation the accelerator pedal potentiometer signal is interpreted by the power train controller 114 as a drive torque demand signal, and the power train controller provides an input to the EMS and to the CVT controller to request a suitable engine torque and transmission ratio to achieve the requested drive torque. The brakes are operated hydraulically at a braking pressure which is controlled directly by the master cylinder 118, subject to an anti-lock function provided by the hydraulic brake control and a traction control function provided by the speed control unit 126.

The speed control unit 126 can, however be switched to a speed control mode in which the signal from the accelerator pedal potentiometer 124 is interpreted as a speed demand signal and the signal from the brake pedal potentiometer 128 is interpreted as a deceleration demand signal. In this case the speed control unit 126 monitors the vehicle speed, compares it with a target speed and target acceleration or deceleration which are determined by the position of the accelerator pedal 125 and the brake pedal 120, determines the most appropriate source of the required drive or braking torque, and sends a torque demand signal to the power train controller 114 or the brake control unit 116 accordingly.

In many respects the control of this system is the same as that of the first embodiment. However with a larger number of sources of driving torque, which can be produced by the engine or the motor/generator and controlled using the transmission, and braking torque, which can be produced by the engine or the motor/generator or the brakes and also controlled using the transmission, the control parameters are clearly different. For example the level of charging of the battery associated with the motor/generator needs to be taken into consideration when determining levels of drive or braking torque the motor/generator can be asked to produce.

In this embodiment the proportion of braking torque from the various sources can be varied with time as in the first embodiment so as to make use of their various characteristics. For example if the driver applied the brake pedal 120 suddenly so as to demand a deceleration of 0.25 g the brakes 106, 108 would provide this almost instantaneously before any assistance could be provided by the motor 109. Then as the level of regenerative braking available from the motor 109 increases this is used increasingly instead of the brakes, whilst keeping the total level of braking constant as required by the driver. Finally the regenerative braking can provide the braking without any assistance from the brakes.

Whilst the embodiments described above both include hydraulic brake systems it will be apparent that electrically actuated brakes, as used in so called 'brake by wire' systems, could easily be controlled so as to form part of a similar system.

What is claimed is:

1. A vehicle speed control system comprising:
   at least one driving device arranged to produce drive for a vehicle;
   at least one braking device arranged to produce braking of the vehicle;
   a vehicle speed sensor for measuring a speed of the vehicle;
   a speed controller communicating with said at least one driving device and said at least one braking device and producing a torque demand signal for one of a driving torque and a braking torque;
   a driver operated accelerator pedal communicating with the speed controller, the accelerator pedal having an associated accelerator pedal position sensor for producing a first signal dependent upon the position of the accelerator pedal and indicative of a demanded acceleration rate;
   a driver operated brake pedal communicating with the speed controller, the brake pedal having a brake pedal position sensor for producing a second signal dependant on the position of the brake pedal and indicative of a demanded deceleration rate;
   the speed controller controlling the driving device based on said first signal received from the accelerator pedal position sensor and controlling the braking device based on the second signal received from the brake pedal position sensor so as to produce via the torque demand signal the demanded acceleration and deceleration rates; and
   wherein the accelerator pedal has a range of accelerator positions, each of the accelerator positions having a target speed associated therewith, and for each of the accelerator positions the braking device and the driving device are actuated by the speed controller to bring the vehicle speed towards the target speed, and the brake pedal has a range of braking positions, each of the braking positions having a target deceleration rate associated therewith, and for each of the braking positions the braking device and the driving device are actuated by the speed controller to decelerate the vehicle at the associated target deceleration rate.

2. The system according to claim 1, wherein the at least one braking device and the driving device are influenced by the controller so as to bring the vehicle speed towards the target speed at a rate which is controlled so as to vary in a predefined manner with the difference between the measured speed of the vehicle and the target speed.

3. The system according to claim 2, wherein the rate at which the vehicle speed is brought towards the target speed is controlled so as to increase as the difference between the target speed and the measured speed of the vehicle increases.

4. The system according to claim 2, wherein the speed controller is arranged to measure the difference between the target speed and the measured speed, to determine a target acceleration rate from said difference, and to control the acceleration of the vehicle towards the target acceleration rate.

5. The system according to claim 1, wherein the vehicle is provided with wheels and the brake pedal has a position and the speed controller is arranged to define a target braking torque which is dependent on the position of the brake pedal and to control the at least one driving device and the at least one braking device so as to apply the target braking torque to the vehicle wheels.

6. The system according to claim 5, wherein the brake pedal has a range of positions, and the speed controller is arranged to define for each of said braking positions a target braking torque and to control the at least one driving device and the at least one braking device so as to produce the demanded braking torque.

7. The system according to claim 1 further comprising a drive controller arranged to control the at least one drive device wherein the speed controller is arranged to produce a torque demand signal indicative of a torque required from the at least one drive device, and the drive controller is arranged to control the at least one drive device so as to produce said torque.

8. The system according to claim 1, wherein the at least one drive device is operable to produce a braking torque and the speed controller is arranged to coordinate operation of the at least one drive device and the at least one braking device to provide braking o the vehicle.

9. The system according to claim 8, wherein the at least one drive device comprises an engine and the speed controller is arranged to control the engine so as to produce engine braking and driving torque as required.

10. The system according to claim 8, wherein the at least one drive device comprises an electric motor and the speed controller is arranged to control the motor so as to produce regenerative braking and driving torque as required.

11. The system according to claim 8, wherein the at least one drive device comprises a transmission having a variable drive ratio and the speed controller is arranged to control the transmission so as to control braking torque and driving torque as required.

12. The systems according to claim 1, wherein the speed controller is operable in a second mode in which each of said accelerator positions has a target drive torque associated with it and the speed controller is arranged to control the at least one drive device to produce the target torque substantially independently of the vehicle speed.

13. The system according to claim 12, wherein the target speed associated with each of said accelerator positions pedal corresponds to the speed at which the vehicle would travel on a flat surface with the accelerator pedal in that position if the controller were in the second mode.

14. A vehicle speed control system comprising:
at least one driving device arranged to produce drive of a vehicle;
a motor-generator coupled to the at least one driving device;
a vehicle speed sensor for determining a speed of the vehicle;
a speed controller; and
a driver operated acceleration demand indicator for producing a signal indicative of a demanded level of acceleration;
a driver operated deceleration demand indicator for producing a signal indicative of a demanded level of deceleration;
wherein the speed of the vehicle is controlled by varying a target acceleration rate within one of a positive acceleration rate and a negative deceleration rate, the vehicle speed controller being arranged to receive each signal from each of the two demand indicators and to control the motor-generator coupled to the at least one driving device, to produce the demanded level of one of acceleration and deceleration.

15. The vehicle speed control system of claim 14 further comprising:
at least one braking device arranged to produce braking of the vehicle; wherein vehicle deceleration is controlled by the speed controller controlling a regenerative braking by a combination of the motor-generator through the coupled at least one driving device, and the at least one braking device.

* * * * *